(12) United States Patent
Krone et al.

(10) Patent No.: US 8,646,390 B2
(45) Date of Patent: *Feb. 11, 2014

(54) DEVICE FOR THE USE OF TECHNICAL EQUIPMENT UNDERWATER

(75) Inventors: Roland Krone, Bremen (DE); Philipp Kraemer, Oldenburg (DE)

(73) Assignee: Stiftung Alfred-Wegener-Institut fuer Polar- und Meeresforschung, Bremerhaven (DE)

( * ) Notice: Subject to any disclaimer, the term of this patent is extended or adjusted under 35 U.S.C. 154(b) by 537 days.

This patent is subject to a terminal disclaimer.

(21) Appl. No.: 12/964,843

(22) Filed: Dec. 10, 2010

(65) Prior Publication Data

US 2011/0140059 A1    Jun. 16, 2011

(30) Foreign Application Priority Data

Dec. 13, 2009    (DE) .......................... 10 2009 058 277

(51) Int. Cl.
*A01K 61/00*    (2006.01)
*B61B 15/00*    (2006.01)

(52) U.S. Cl.
USPC .......................... 104/127; 119/208; 414/137.7

(58) Field of Classification Search
USPC .............. 104/127–129, 173.1; 119/200, 208; 187/239; 414/137.7
See application file for complete search history.

(56) References Cited

U.S. PATENT DOCUMENTS

| 7,204,344 B2* | 4/2007 | Korchagin et al. ............. 182/82 |
| 7,766,608 B2 | 8/2010 | Wobben |
| 8,413,609 B2* | 4/2013 | Krone et al. .................. 119/200 |

FOREIGN PATENT DOCUMENTS

| DE | 19921312 A1 | 11/2000 |
| DE | 10308499 A1 | 9/2004 |
| DE | 20310089 U1 | 12/2004 |
| DE | 102008020965 A1 | 10/2009 |
| EP | 381665 A2 | 8/1990 |
| GB | 2270664 A | 3/1994 |
| GB | 2471257 A | 12/2010 |

* cited by examiner

*Primary Examiner* — Zachary Kuhfuss
(74) *Attorney, Agent, or Firm* — Leydig, Voit & Mayer, Ltd.

(57) ABSTRACT

A device for using technical equipment underwater includes at least one guide rail configured to extend vertically underwater on an edifice from above a waterline. At least one device carriage is provided and includes a basic unit having a reception flange configured to couple the technical equipment thereto, and at least one running unit that abuts against the guide rail via guide rollers. A press-on unit is disposed on a first side of the device carriage and includes a lever pivotable on an axis of the device carriage so as to generate a pressing force of the device carriage against the guide rail. The lever includes a support roller at a first end and a weight packet at a second end so as to exert a downward drifting force underwater that is greater than a buoyancy of the device carriage. At least two spacers are each disposed at a first end on the at least one device carriage and abutting the edifice at a second end. A veering and hoisting device is detachably connectable with the device carriage via a coupling device, and is configured to control deployment and retrieval of the device carriage.

13 Claims, 4 Drawing Sheets

DEVICE FOR THE USE OF TECHNICAL EQUIPMENT UNDERWATER

CROSS-REFERENCE TO PRIOR APPLICATIONS

Priority is claimed to German Patent Application No. DE 10 2009 058 277.0, filed Dec. 13, 2009, the entire disclosure of which is hereby incorporated by reference herein.

FIELD

The present invention relates to a device for the use of technical equipment underwater, with at least one guide rail on an edifice exposed to water extending vertically underwater from above the waterline, and at least one device carriage.

BACKGROUND

Offshore edifices are increasingly being used for energy production, for example wind power plants. However, erecting the latter in often inaccessible water regions creates additional problems with respect to servicing and maintenance of such edifices, including the delivery of structural and replacement parts. As a rule, expensive diver or crane teams are used for this purpose.

DE 103 08 499 A1 describes how to enable access to the tower of an offshore wind power plant through an underwater airlock from a submarine. However, this still remains a very cost-intensive measure.

DE 199 21 312 A1 describes a device for deploying and retrieving heavy technical marine equipment, which is intended to counter the risk of oscillation. To this end, the outboard of a ship has a vertical rail system with a forklift carriage that can traverse from the deck of the ship to under the waterline, the forks of which can be swiveled laterally away. The deck of the ship has a horizontal rail system with a device carriage, on which the heavy measuring equipment can be transported as far as the forklift carriage. The heavy measuring equipment is deployed or retrieved in the water after the forklift carriage has moved under the waterline by laterally swiveling away the forks of the forklift carriage. Hence, the vertical rail system is used to precisely guide the measuring equipment; the submerging and retrieval processes take place using a single drive.

EP 0 381 665 A2 describes a device for manufacturing strands of individual elements underwater, in which the individual elements are first transported on a device carriage along a vertical rail system on the floor of the body of water, taken from there by another device carriage on a horizontal rail system, and transported to the already pre-assembled individual segments. A device for assembling and servicing underwater power plants is described in DE 10 2008 020 965 A1, in which the components are delivered with a traversable underwater carriage with a crane system. The underwater carriage is provided with a horizontal rail system for pushing the components onto the crane system. DE 203 10 089 U1 describes a tower of a wind power plant with a rail system that circulates horizontally above the waterline, in which a device can be suspended in a desired position along the periphery of the tower.

GB 2 270 664 A describes a generic device for using technical equipment underwater, wherein an anchoring system is involved in particular. The latter encompasses several guide rails extending underwater from above the waterline, which in the exemplary embodiment shown are secured to the post of a footbridge standing in the water. A device carriage has a running unit, which abuts the guide rail with guide rollers. The guide rails can here be C-shaped, so that the guide rollers abut against the front C-legs from the inside. An I-shaped formation is also possible for the guide rails. The running unit is connected with a basic unit, which itself bears a reception flange for a device. In the exemplary embodiment, a fender is disclosed as the device, which can then be used to berth a boat on the footbridge independently of the tide. The device carriage then traverses the vertical guide rail based on the tide, wherein no veering and hoisting equipment is provided. Exclusively the movement of the boat generates the traveling motion. However, the boat movements, buoyancy and currents can result in horizontal and vertical tilting of the running unit of the device carriage in the guide rail. Further, the device can only work in the waterline region, since the traveling motions of the device carriage are generated exclusively by the boat movements. The device carriage is not designed to traverse the deeper underwater regions too. If the device carriage with the fender accidentally sinks into the water, the buoyancy of the fender will also inevitably cause the running unit of the device carriage to tile horizontally and vertically in the guide rail.

SUMMARY

In an embodiment, the present invention provides a device for using technical equipment underwater including at least one guide rail configured to extend vertically underwater on an edifice from above a waterline. At least one device carriage is provided and includes a basic unit having a reception flange configured to couple the technical equipment thereto, and at least one running unit that abuts against the at least one guide rail via guide rollers. A press-on unit is disposed on a first side of the at least one device carriage and includes a lever pivotable on an axis of the at least one device carriage so as to generate a pressing force of the at least one device carriage against the at least one guide rail. The lever includes a support roller at a first end thereof and a weight packet at a second end thereof so as to exert a downward drifting force underwater that is greater than a buoyancy of the at least one device carriage. At least two spacers, each disposed at a respective first end thereof on the at least one device carriage and abutting the edifice at a respective second end thereof, are also provided. A veering and hoisting device is detachably connectable with the at least one device carriage via a coupling device, and is configured to control deployment and retrieval of the device carriage.

BRIEF DESCRIPTION OF THE DRAWINGS

The device for using technical equipment underwater according to the present invention will be described in even greater detail below based on the diagrammatic, exemplary figures, which are not to scale. The invention is not limited to the exemplary embodiments. Other features and advantages of various embodiments of the device according to the present invention will become apparent by reading the following detailed description with reference to the attached drawings which illustrate the following.

Figure 1:
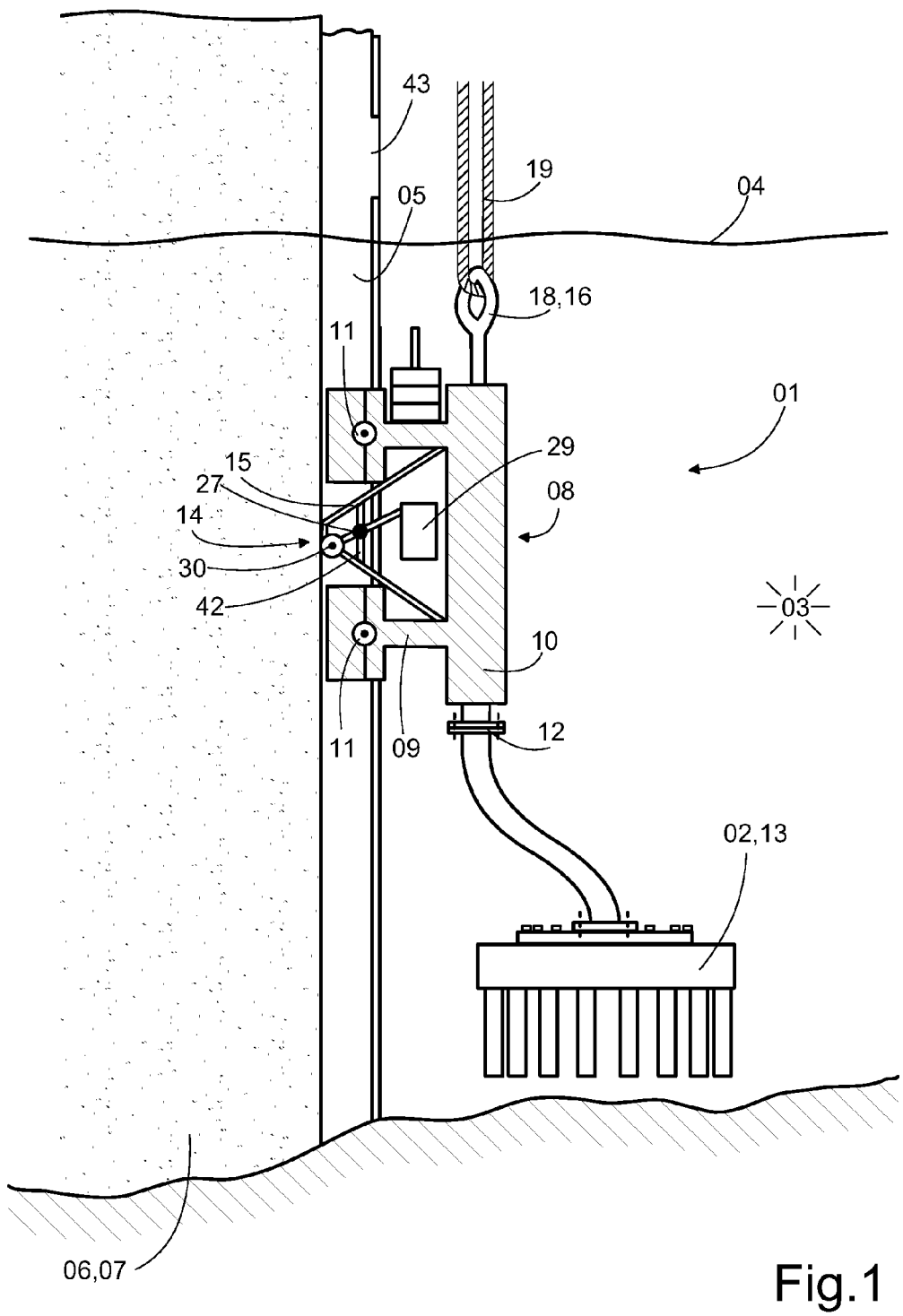
FIG. 1 is a perspective view of the device with a sampler.

In an embodiment, the present invention provides a device that largely precludes any tilting of the running unit of the device carriage in a guide rail, and enables smooth gliding. At the same time, the device is also able to submerge the device carriage in the deeper underwater region and again retrieve it from there.

The device according to an embodiment of the present invention includes a respective press-on unit on either side of the device carriage with a lever, with a support roller at its one end, and a weight packet at its other end. The downward drifting force exerted by the weight packet in the water is greater than the buoyancy of the device carriage. Further, the lever is pivoted on an axis in the basic unit for generating a pressing force of the device carriage against the edifice. This pressing force of the device carriage is applied by the weight packet, and acts on the edifice via the pivoted lever and support roller. This measure compensates for the buoyancy of the device carriage underwater, which can cause the running unit to vertically tilt on the guide rail. Horizontal tilting is prevented in the invention by providing two spacers, one respective end of which is arranged on a longitudinal side of the device carriage, and the other end of which abuts the edifice. These spacers are simultaneously used to avoid excessive forces from acting on the guide rail. The currents cause the submerging device to drift downward as a function of the slack in the rope afforded by the veering and hoisting device. This makes it possible to precisely control the rate of submergence down to the stopping point. The device carriage is also retrieved using the veering and hoisting device. A coupling device is provided on the device carriage to detachably connect the device carriage with the veering and hoisting device. This can be a simple eyelet, for example, into which the rope of a cable winch as the veering and hoisting device is snapped before the device carriage is submerged.

Accordingly, the device according to an embodiment of the present invention for using technical equipment underwater is a simple, reliable and easy to use structure, with which a device carriage can be placed at great depths underwater without any further propulsion. It is here safely guided along a simple guide rail secured accordingly to the edifice, thereby reliably preventing the device carriage from drifting away in the water currents. The guide rail can here be easily provided directly on the edifice, or also secured thereto after the fact. In addition, the measures according to an embodiment of the present invention as explained above ensure that the device carriage glides along safely and without tilting. The device carriage is also easy to retrieve by means of the veering and hoisting device, for example a simple cable winch, along the guide rail. The device carriage makes it possible to submerge a wide variety of devices, tools and materials into the underwater region. Depending on how far down the guide rail extends, deliveries can be made all the way to the water floor, wherein the divers can also advantageously hold on to the guide rail as a "handrail", as the underwater edifices are otherwise usually completely smooth. The water or fauna and flora in the water can also be measured or sampled while submerging or hauling up the device carriage, so that profile measurements can be performed on a wide variety of parameters over the water depth. In particular in proximity to the pylons of wind power plants, for example, routine determinations of aufwuchs fauna and technical inspections of the structure are prescribed. The device according to an embodiment of the present invention makes it possible to completely automate these samplings and measurements, and make them absolutely reproducible. As a result, the invention can greatly assist or even partially replace maintenance and diver teams during the operational maintenance of underwater edifices, for example the offshore pylons of a wind power plant. Since structural design of the device according to an embodiment of the present invention causes it to abut very tightly against the edifice, its environment is also not impaired, especially with respect to the currents and animal community.

As already stated, the device carriage submerges as it drifts downward under its own weight. The veering and hoisting device can here only reduce the rate of submergence. By contrast, providing the device carriage with additional weights accelerates the process. Making the device carriage heavier also improves the pressure against the edifice, so that lifting and tilting can be more effectively avoided.

It is further advantageous for the device to have a T-shaped guide rail with a longitudinal leg and transverse leg, and a T-shaped guide groove in the running unit, with which the latter overlaps the T-shaped guide rail. As a result, the transverse leg already provides an initial safeguard against the lifting off of the device carriage. In addition, the guide rollers of the running unit can advantageously be provided inside the T-shaped guide groove on either side of the longitudinal leg in this type of configuration. The latter can here be arranged in such a way as to abut either the longitudinal leg and/or transverse leg of the T-shaped guide rail in pairs, i.e., opposite each other. As a consequence, the running unit of the device carriage can slide or roll optimally onto the guide rail, and another safeguard is taken to prevent the device carriage from tilting.

Given a T-shaped configuration of the guide rail and guide groove in the running unit, the corresponding flanks of the guide groove overlap the transverse leg of the guide rail from behind. Therefore, the device carriage can be placed on the guide rail from its end. However, since it cannot always be guaranteed that a maintenance ship, for example, will always be able to reach the end of the guide rail, it is advantageous for introduction recesses to be provided in the transverse leg of the T-shaped guide rail to insert the running unit of the device carriage. To enable insertion at varying heights, for example as a function of boat level at different tides, more recesses spaced correspondingly apart from each other can be provided. Such recesses are especially easy to incorporate if the guide rail preferably consists of a simple steel rail, which is bolted or welded to the edifice. Another especially simple material application is obtained if the spacers for laterally stabilizing the device carriage on the guide rail and preventing excessive forces from acting on the guide are made out of a simple steel pipe that is bent or angled based on its spacing function. To permit the spacers to slide especially smoothly over the edifice and prevent them from impeding the motion of the device carriage, it is further advantageous to provide additional support rollers on the side of the spacers that abuts the edifice.

The mentioned structural measures in the device according to the invention are geared toward allowing the device carriage to slide on the guide rail without tilting. To prevent this sliding from being impeded by foreign objects, in particular fouling or animal filler, on the guide rail, it is further advantageous to provide at least the lower end of the running unit with clearing stubs spaced closely apart from the guide rail. The latter operate like a snow shovel in front of a locomotive. Since filler or fouling can arise relatively quickly underwater, it is further advantageous to also provide these clearing stubs at the upper end of the running unit of the device carriage. As a result, the guide rails can also be cleared while hoisting the device carriage.

Depending on the type of the device built onto the device carriage, it may required supply and data lines ("cables"). To prevent the latter from getting hooked into the guide rail or being carried away by the currents, the device carriage can already exhibit the corresponding cable guide elements. However, to ensure reliable guidance over a larger distance as well, it is advantageous to provide at least one glider above the device carriage, which is securely coupled to the cable, thereby preventing the cable or a supply line from excessively bulging. In principle, the glider is comparable to the running cable holders in a portal crane system. Further, the glider can in principle be similar in structure to the device carriage or running unit. In an embodiment, the present invention also makes it possible to provide at least one additional device carriage under the device carriage. The latter can then have a colonization and harvesting basket for hardground animals, and remain on the water floor for a prolonged period of time. This requires a detachable coupling with the device carriage, with which the additional device carriage can again be retrieved when necessary. For example, such a detachable coupling can consist of a scavenging mandrel with a shoulder on the additional device carriage, which enters into a scavenging bell with a upwardly shiftable shoulder as the latter is submerged, so that the shoulders are detachably hooked in one after the other. Otherwise, the additional device carriage in principle has the same basic structural design as the device carriage.

As already stated further above, the device carriage can carry a wide variety of devices for performing a wide variety of jobs. The device carriage essentially exhibits a reception flange to accommodate the technical equipment. In this case, it is advantageous that the reception flange of the device carriage be correspondingly designed to be coupled to an inspection camera, sampler, measuring device, crane system, lamp, trapping device or simple load hook as the technical equipment, for example.

In addition, underwater operations can be further simplified in the device according to an embodiment of the present invention by providing several guide rails next to each other on the edifice. For example, this makes it possible to sample a large volume of water. To this end, a single device carriage placed on the various guide rails in chronological intervals can be provided, but several device carriages working in parallel can also be provided. The same then holds true for the veering and hoisting device, wherein only one device is used as a rule, arranged on a boat or working platform. However, in particular given a round column, a horizontally circulating rail can be provided above the waterline, hooked into the veering and hoisting device, and positioned at any position along the periphery. Basically, the veering and hoisting device can preferably be a mechanically or electrically actuated cable winch as the veering and hoisting device, which is situated either above the waterline on the edifice itself or on a floating unit. Other structural details of the device according to the invention can be gleaned from the exemplary embodiments described below.

Shown on FIG. 1 is a device 01 according to an embodiment of the invention for using technical equipment 02 underwater 03. The device 01 encompasses a guide rail 05 extending vertically underwater 03 from above the waterline 04, which is arranged on an edifice 06 exposed to water, a pylon 07 of an offshore wind power plant in the example shown, and a device carriage 08. In the exemplary embodiment shown, the latter consists of two running units 09 and a basic unit 10 (here with a rectangular cross section). The running units 09 abut the guide rail 05 via guide rollers 11 (dashed lines) (see also FIG. 3). The basic unit 10 has a reception flange 12. In the exemplary embodiment shown, a sampler 13 for collecting water samples is coupled thereto as the technical equipment 02 via a threaded joint. Also depicted on FIG. 1 are press-on units 14, spacers 15 and additional weights 17 for stabilizing the device carriage 08, which are explained in greater detail on FIG. 2. Finally depicted on FIG. 1 is a coupling device 18 in the form of an eyelet 16 for attaching a veering and hoisting rope 19 in another veering and hoisting device arranged above the waterline 04 (not shown in any greater detail), which can correspondingly take the form of a cable winch.

The device carriage 08 can get onto the guide rail 05 either from the upper end of the guide rail 05 or, if this end cannot be reliably accessed from a boat, for example, via introduction recesses 43 situated above the waterline 04. In a T-shaped guide rail 20 (see below), the transverse leg 23 is correspondingly recessed, so that only the longitudinal leg 21 remains standing in the area of the introduction recesses 43. In order to place the device carriage 08 at different heights, several introduction recesses 43 spaced apart from each other can be provided one over the other in the guide rail 05.

Figure 2:
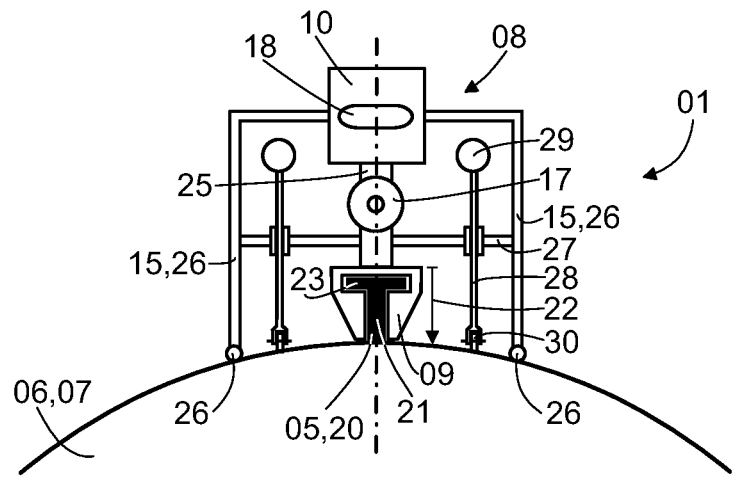
FIG. 2 is a top view of the device.

FIG. 2 shows a cross section through the device 01. Clearly visible is the edifice 06, secured to which is the guide rail 05, a T-shaped guide rail 20 with a longitudinal leg 21 and a transverse leg 23 in the exemplary embodiment shown. The running unit 09 of the device carriage 08 overlaps the T-shaped guide rail 20 with a T-shaped guide groove 24. This arrangement has an installation depth 22 of approx. 20 cm, so that it very closely abuts the edifice 06 and is not a source of disruption. The stable transverse carriers 25 of the basic unit 10 carry the running units 09. Also depicted are the additional weights 17 on the upper transverse carrier 25 and the coupling device 18 at the upper end of the basic unit 10. Also depicted are two spacers 15 for laterally stabilizing the device carriage 08 on the guide rail 05 and preventing excessive forces from acting on the guide rail 05, the one end of which is secured to the basic unit 10. They abut the edifice 06 via support rollers 26 at their other end. In the selected exemplary embodiment, the spacers 15 consist of trapezoidally angled steel pipes 26. Secured between the latter on transverse axes 42 is a longitudinal axis 27, upon which levers 28 are pivoted. These levers 28 have a weight packet 29 at one end, and a support roller 30 at the other end. The downward drifting force exerted by the weight packet 29 is here greater than the buoyancy of the device carriage 08, so that the weight packet 29 acts via the lever 28 and support roller 30, causing the device carriage 08 to exert a pressing force on the edifice 06, thereby significantly ameliorating the problem of the device carriage 08 lifting and tilting due to its buoyancy.

Figure 3:
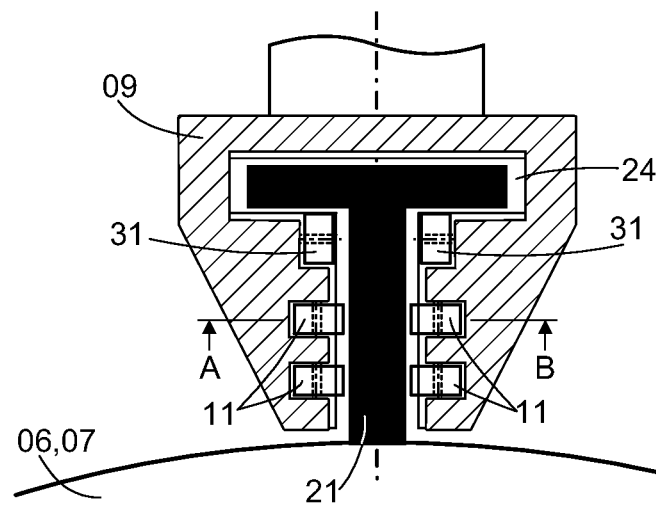
FIG. 3 is a cross section through the device in the area of the running unit.

FIG. 3 shows a cross section through the running unit 09 in the area of the guide rollers 11. Clearly evident are four paired guide rollers 11 arranged in the T-shaped guide groove 24, which abut against the longitudinal leg 21 of the T-shaped guide rail 20. Further provided are two guide rollers 31 in the T-shaped guide groove 24, which abut against the transverse leg 23 of the T-shaped guide rail 20, which results in a running unit 09 that runs smoothly and without tilting on the T-shaped guide rail 20.

Figure 4:
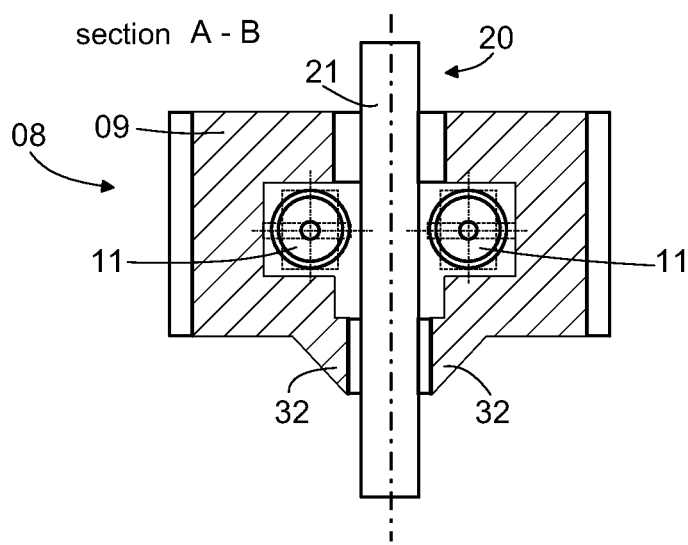
FIG. 4 is a longitudinal section through the device in the area of the lower running unit.

FIG. 4 shows a section AB through the guide rollers 11 on FIG. 3. Clearly evident are the longitudinal leg 21 of the T-shaped guide rail 20 and the running unit 09 with the two guide rollers 11. Also depicted in the lower region of the running unit 09 are two clearing stubs 32, which clear the fauna and flora filler from the T-shaped guide rail 20 while the device carriage 08 is being submerged. Similarly, clearing sub can also be provided at the upper end of the running unit 09, which clear the T-shaped guide rail 20 while the device carriage 08 is being hoisted.

Figure 5:
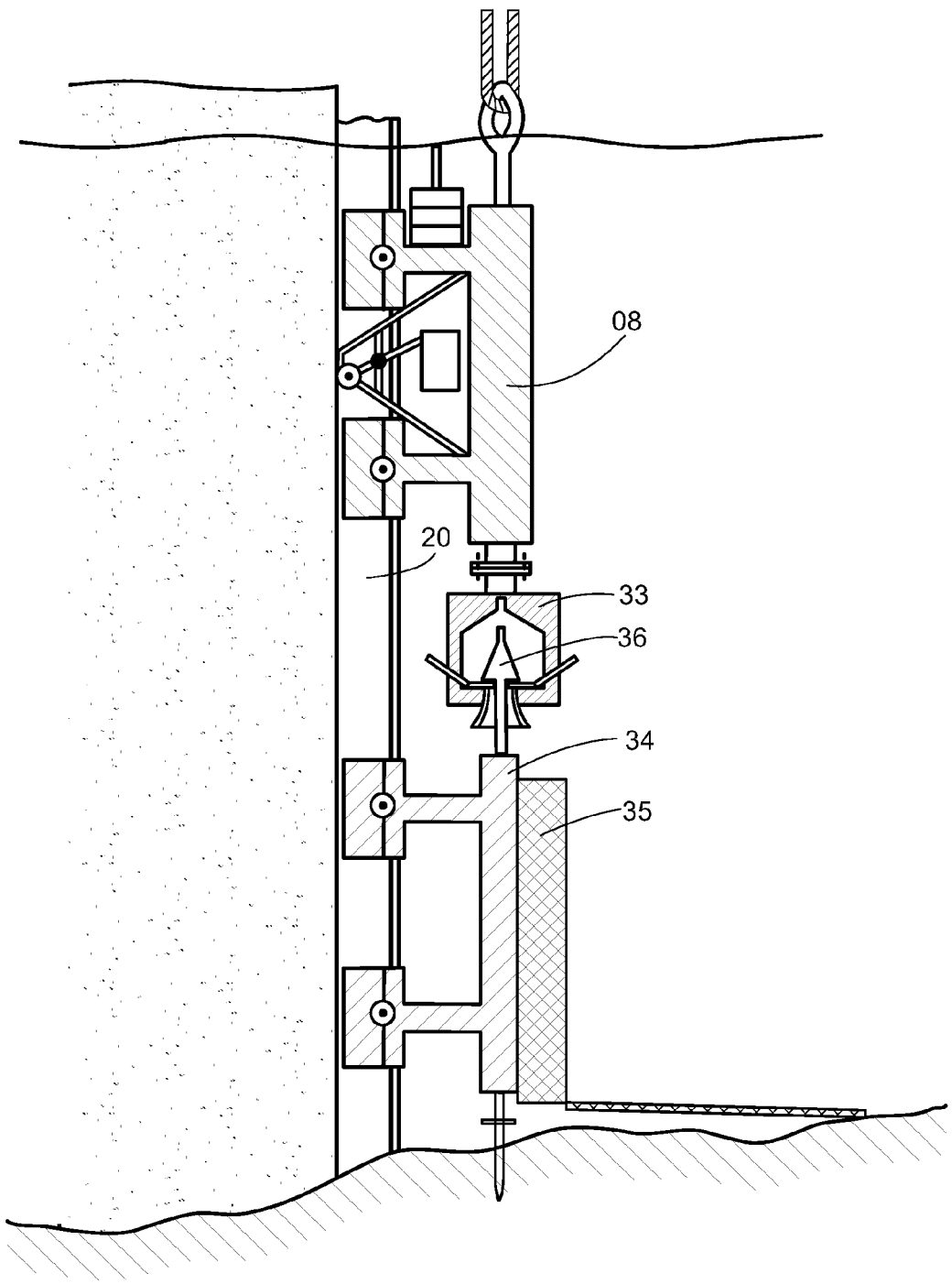
FIG. 5 is a cross section of the device with a scavenging bell and another device carriage.

FIG. 5 shows the device carriage 08 with a scavenging bell 33 to be coupled to an additional device carriage 34, for example which carries a colonization and harvesting basket 35 for colonizing and trapping hardground animals, and can remain on the water floor for a prolonged period of time. To this end, the additional device carriage 34 is simply lowered on the guide rail 20 without the device carriage 08. For retrieval, a coupling is then established with the also submerged device carriage 08 via the scavenging bell 33, into which a scavenging mandrel 36 detachably threads and latches, so that the additional device carriage 34 along with the device carriage 08 can be hauled in again.

Figure 6:
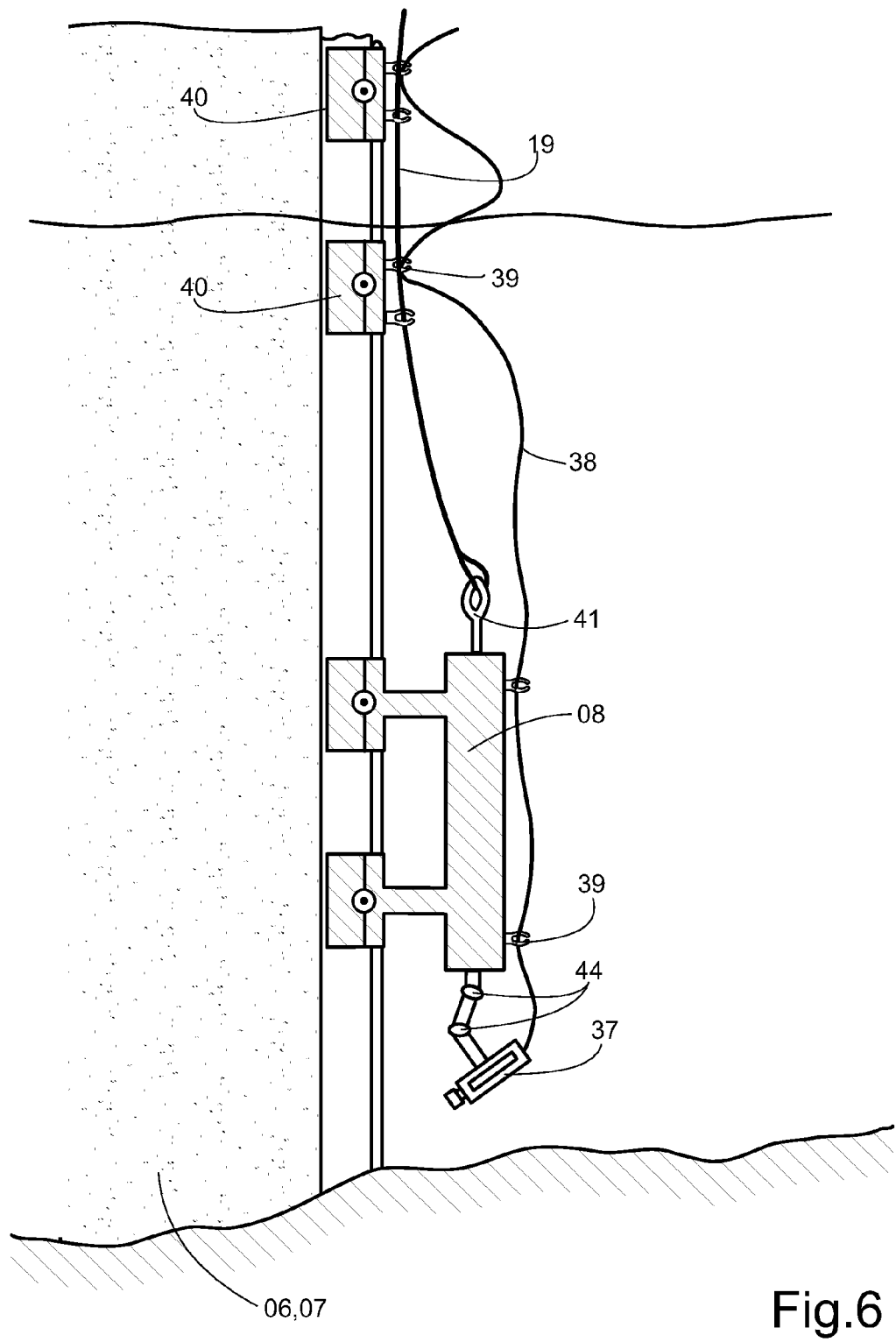
FIG. 6 is a cross section of the device with a video camera and an additional device carriage.

FIG. 6 shows the device carriage 08 with a video camera 37, for example to inspect the edifice 06, 07. The video camera 37 is mounted on multiple hinges by providing hinges 44 so as to optimize alignment. A supply and data cable 38 for the video camera 37 is securely mounted and run in cable routing elements 39 on two gliders 40 in the selected exemplary embodiments, so as to avoid impediments or damages. The supply and data cable 38 is here arranged in loops to prevent excessive tensile loading. The veering and hoisting rope 19 of the device carriage 08 can also be secured and guided in the cable routing elements 39.

While the invention has been particularly shown and described with reference to preferred embodiments thereof, it will be understood by those skilled in the art that various changes in form and details may be made therein without departing from the spirit and scope of the invention.

REFERENCE LIST

01 Device
02 Technical equipment
03 Underwater (region)
04 Waterline
05 Guide rail
06 Edifice (exposed to water)
07 Pylon
08 Device carriage
09 Running unit
10 Basic unit
11 Guide roller
12 Reception flange
13 Sampler
14 Press-on unit
15 Spacer
16 Eyelet
17 Additional weight
18 Coupling device
19 Veering and hoisting rope
20 T-shaped guide rail
21 Longitudinal leg of T-shaped guide rail
22 Installation depth
23 Transverse leg of T-shaped guide rail
24 T-shaped guide groove
25 Transverse carrier of basic unit
26 Steel pipe
27 Longitudinal axis
28 Lever
29 Weight packet
30 Support roller
31 Guide roller
32 Clearing stub
33 Scavenging bell
34 Additional device carriage
35 Colonization and harvesting basket
36 Scavenging mandrel
37 Inspection camera
38 Supply and data cable
39 Cable routing element
40 Glider
41 Coupling rod
42 Transverse axis
43 Introduction recess
44 Hinge

The invention claimed is:

1. A device for using technical equipment underwater comprising:
    at least one guide rail configured to extend vertically underwater on an edifice from above a waterline;
    at least one device carriage including a basic unit having a reception flange configured to couple the technical equipment thereto, and at least one running unit that abuts against the at least one guide rail via guide rollers;
    a press-on unit disposed on a first side of the at least one device carriage and including a lever pivotable on an axis of the at least one device carriage so as to generate a pressing force of the at least one device carriage against the at least one guide rail, the lever including a support roller at a first end thereof and a weight packet at a second end thereof so as to exert a downward drifting force underwater that is greater than a buoyancy of the at least one device carriage;
    at least two spacers each disposed at a respective first end thereof on the at least one device carriage and abutting the edifice at a respective second end thereof; and
    a veering and hoisting device detachably connectable with the at least one device carriage via a coupling device, the veering and hoisting device being configured to control deployment and retrieval of the at least one device carriage.

2. The device according to claim 1, further comprising additional weights disposed on the at least one device carriage.

3. The device according to claim 1, wherein the at least one guide rail is a T-shaped guide rail having a longitudinal leg and a transverse leg, and wherein the at least one running unit includes a T-shaped guide groove configured to overlap the T-shaped guide rail with the guide rollers disposed on an inside of the T-shaped guide groove such that the guide rollers abut at least one of the longitudinal leg and the transverse leg of the T-shaped guide rail.

4. The device according to claim 3, wherein the transverse leg of the T-shaped guide rail includes insertion recesses configured for insertion of the at least one running unit of the at least one device carriage.

5. The device according to claim 3, wherein the T-shaped guide rail is a straight steel rail and the at least two spacers include at least one of a bent steel pipe and a trapezoidal steel sheet.

6. The device according to claim 1, wherein the at least two spacers include a respective support roller disposed at the respective second end.

7. The device according to claim 1, wherein at least a lower portion of the at least one running unit includes clearing stubs spaced closely to the at least one guide rail.

8. The device according to claim 1, further comprising at least one glider including at least one cable routing element disposed above the at least one device carriage.

9. The device according to claim 1, further comprising at least one additional device carriage disposed below and detachably connectable with the at least one device carriage, the at least one additional device carriage including a colonization and harvesting basket for hardground animals.

10. The device according to claim 1, wherein the technical equipment includes at least one of a video camera, a sampler, a measuring device, a crane system, a lamp, a trapping device and a simple load hook.

11. The device according to claim 1, wherein the at least one guide rail includes a plurality of guide rails disposed side-by-side on the edifice.

12. The device according to claim 1, wherein the at least one guide rail includes a plurality of guide rails, and wherein the veering and hoisting device and the at least one device carriage are configured for chronologic, sequential use on the plurality of guide rails.

13. The device according to claim 1, wherein the veering and hoisting device includes a cable winch disposed above the waterline on at least one of the edifice and a floating unit.

* * * * *